Figure 1:
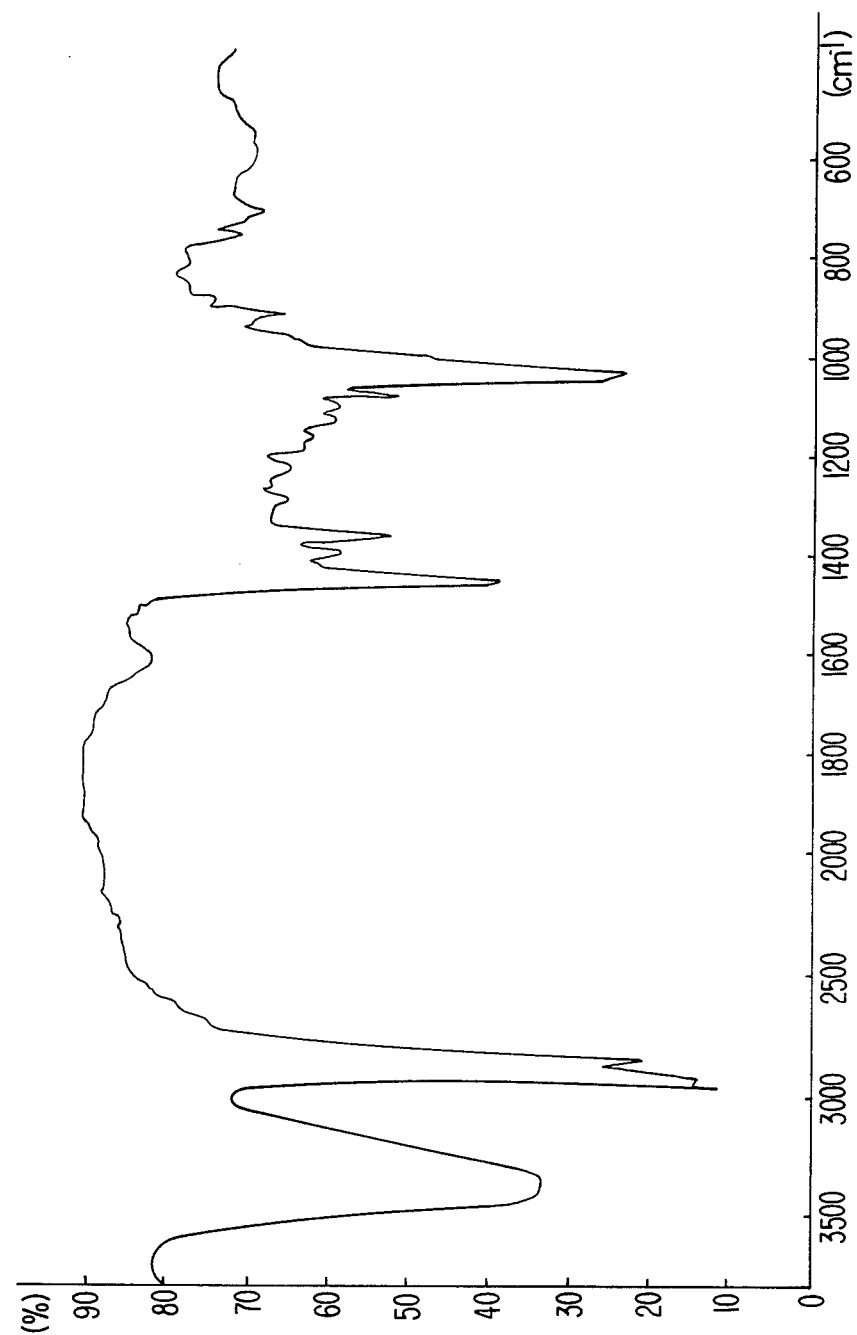

United States Patent [19]

Yamane et al.

[11] Patent Number: 4,562,239

[45] Date of Patent: Dec. 31, 1985

[54] URETHANE POLYMERS CONTAINING A TERTIARY NITROGEN ATOM, AND THEIR PRODUCTION

[75] Inventors: Noriomi Yamane, Kyoto; Yoshikazu Arimatsu, Otsu; Kenichi Katsuo, Otsu; Minoru Saitoh, Otsu; Katsya Tani, Shiga; Hideyuki Mitamura; Kamatani Hiroyoshi, both of Otsu, all of Japan

[73] Assignee: Toyo Boseki Kabushiki Kaisha, Osaka, Japan

[21] Appl. No.: 638,007

[22] Filed: Aug. 6, 1984

Related U.S. Application Data

[63] Continuation of Ser. No. 405,641, Aug. 5, 1982, Pat. No. 4,480,705.

[30] Foreign Application Priority Data

Aug. 5, 1981 [JP] Japan ................................ 56-122774
Sep. 10, 1981 [JP] Japan ................................ 56-143568

[51] Int. Cl.$^4$ ........................ C08G 18/32; C08G 18/38
[52] U.S. Cl. .................................... 528/65; 528/61; 528/73; 528/78; 528/82; 525/458; 525/459
[58] Field of Search ................ 528/61, 65, 73, 78, 528/82; 525/458, 459

[56] References Cited

U.S. PATENT DOCUMENTS 3,461,101 8/1969 Oertel et al. ........................ 528/61
3,461,106 8/1969 Oertel et al. ........................ 528/61
3,475,377 10/1969 Rosendahl et al. ................ 528/61

*Primary Examiner*—Herbert S. Cockeram

[57] ABSTRACT

A tertiary nitrogen atom-containing urethane polymer which comprises units of the following formulas (I) and (II) as the essential components and units of the following formulas (III), (IV) and (V) as the optional components, the content of the unit of the formula (I) being not less than 10 milliequivalents in terms of the tertiary nitrogen atom per kilogram of the urethane polymer, and has a molecular weight of not less than 500:

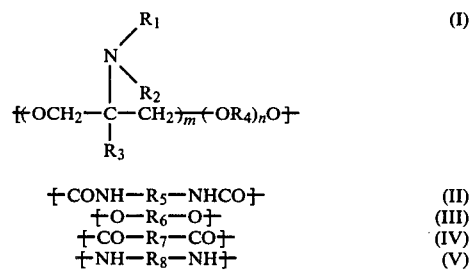

$+\text{CONH}-R_5-\text{NHCO}+$ (II)
$+\text{O}-R_6-\text{O}+$ (III)
$+\text{CO}-R_7-\text{CO}+$ (IV)
$+\text{NH}-R_8-\text{NH}+$ (V)

wherein $R_1$ and $R_2$ are each a $C_1$–$C_4$ alkyl group and, when taken together with the adjacent nitrogen atom to which they are attached, represent a nitrogen-containing heterocyclic group, $R_3$ is a $C_1$–$C_4$ alkyl group, $R_4$ is an optionally branched $C_1$–$C_8$ alkylene group, m is a positive integer and n is zero or a positive integer but m+n is a number which can provide the unit of the formula (I) with a molecular weight of 131 to 6998 and the bondings in the unit of the formula (I) may be in random and/or block, $R_5$ is a residue of an organic diisocyanate, $R_6$ is an optionally branched $C_1$–$C_8$ alkylene group, an aromatic group optionally substituted with one or more $C_1$–$C_4$ alkyl groups and/or one or more halogen atoms or a residue of a polyetherdiol thereof, $R_7$ is a residue of a dicarboxylic acid and $R_8$ is a residue of a diamine or a residue of a hydrazine, which is effective in improvement of resistance to color change due to gas.

4 Claims, 3 Drawing Figures

URETHANE POLYMERS CONTAINING A TERTIARY NITROGEN ATOM, AND THEIR PRODUCTION

This is a continuation of application Ser. No. 405,641 filed Aug. 5, 1982 now U.S. Pat. No. 4,480,705.

The present invention relates to novel urethane polymers containing a tertiary nitrogen atom, and their production. More particularly, it relates to tertiary nitrogen atom-containing urethane polymers improved in resistance to color change due to gas, dyeing property, etc. or effective in improvement of those physical properties of other polymers, and their production.

In general, polyesters, polyurethanes, etc. have poor affinity for ionic dyes and are difficult to dye. On the other hand, they can be dyed well with dispersed dyes, but fastness is insufficient, particularly in polyurethanes. Further, polyurethane products such as elastic fibers, foams, elastomers and synthetic leathers are apt to be changed in color in an atmosphere of combustion gas or nitrogen oxide gas or in the outdoor atmosphere. Furthermore, polyurethanes having urea bonds, urethane bonds, ether bonds or ester bonds in the molecules usually contain oxidation inhibitors, ultraviolet ray absorbers, etc., and these additives tend to accelerate the color change due to combustion gas, nitrogen oxide gas, etc.

For prevention of the color change due to gas, there have been proposed various additivies, but most of them are not sufficiently effective. Further, even when effective, their incorporation frequently deteriorates other properties or results in lowering of durability.

On the other hand, tertiary amines are often incorporated into polyesters, polyurethanes, etc. as additives or as the monomeric components in order to impart a dyeing property with an anionic dye thereto. For instance, U.S. Pat. No. 2,999,839, British Pat. No. 1,104,127 and Japanese Patent Publications Nos. 19491/61 and 2904/71 propose to use N,N-dialkyl-$\beta$-aminoethyl methacrylates. However, their incorporation results in bleeding onto the polymer surfaces and production of scum at the spinning step which may cause cutting of yarns and yellowing of elastic fibers.

It is a main object of the present invention to provide a urethane polymer improved in resistance to color change due to gas. Another object of this invention is to provide a urethane polymer which has improved dyeing property and fastness and can provide a fairly dyed product. A further object of the invention is to provide a urethane polymer excellent in physical properties such as molding properties, mechanical strength and whiteness. These and other objects will be apparent to those skilled in the art from the foregoing and subsequent descriptions.

According to the present invention, there is provided a tertiary nitrogen atom-containing urethane polymer which comprises units of the following formulas (I) and (II) as the essential components and units of the following formulas (III), (IV) and (V) as the optional components, the content of the unit of the formula (I) being not less than 10 milliequivalents in terms of the tertiary nitrogen atom per kilogram of the urethane polymer, and has a molecular weight of not less than 500:

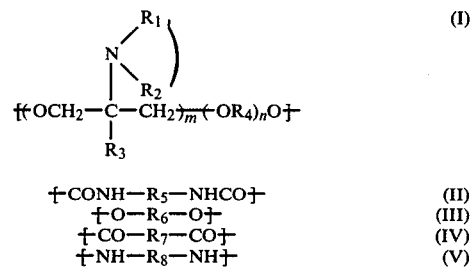

$$+CONH-R_5-NHCO+ \quad (II)$$
$$+O-R_6-O+ \quad (III)$$
$$+CO-R_7-CO+ \quad (IV)$$
$$+NH-R_8-NH+ \quad (V)$$

wherein $R_1$ and $R_2$ are each a $C_1$-$C_4$ alkyl group, $R_3$ is a $C_1$-$C_4$ alkyl group, $R_4$ is an optionally branched $C_1$-$C_8$ alkylene group, m is a positive integer and n is zero or a positive integer but m+n is a number which can provide the unit of the formula (I) with a molecular weight of 131 to 6998 and the bondings in the unit of the formula (I) may be in random and/or block, $R_5$ is a residue of an organic diisocyanate, $R_6$ is an optionally branched $C_1$-$C_8$ alkylene group, an aromatic group optionally substituted with one or more $C_1$-$C_4$ alkyl groups and/or one or more halogen atoms or a residue of a polyetherdiol thereof, $R_7$ is a residue of a dicarboxylic acid and $R_8$ is a residue of a diamine or a residue of a hydrazine.

When the urethane polymer of the invention has relatively small molecular weight, a comparatively large amount of the tertiary nitrogen atom may be introduced therein. Such urethane polymer may be used as improvers for various other polymers, particularly polyurethanes. They can prevent the color change of other polymers due to combustion gas or light and impart excellent affinity for anionic dyes to other polymers without deterioration of the advantageous physical properties inherent thereto.

When the urethane polymer of the invention has a relatively large molecular weight, a comparatively small amount of the tertiary nitrogen atom may be introduced therein. Such urethane polymer may be used with or without incorporation of any additive for manufacture of various shaped products such as fibers, films, tapes, etc., which are stabilized to combustion gas or light and improved in dyeing property.

Quaternization of the urethane polymer of the invention can provide the polymer with antistatic properties and impart further improved dyeing property thereto. Such quaternized urethane polymer can be combined with heparin to make an anti-thrombosis material.

The unit of the formula (I) may be originated from 2-alkyl-2-dialkylamino-1,3-propanediols, of which specific examples are 2-methyl-2-dimethylamino-1,3-propanediol, 2-ethyl-2-dimethylamino-1,3-propanediol, 2-ethyl-2-diethylamino-1,3-propanediol, 2-ethyl-2-dipropylamino-1,3-propanediol, 2-ethyl-2-dibutylamino-1,3-propanediol, 2-butyl-2-dibutylamino-1,3-propanediol, 2-ethyl-2-piperidyl-1,3-propanediol, 2-ethyl-2-(1',3'-dihydroisoindol-2'-yl)-1,3-propanediol, etc. Among these specific examples, 2-ethyl-2-dibutylamino-1,3-propanediol, 2-ethyl-2-dipropylamino-1,3-propanediol, 2-ethyl-2-dimethylamino-1,3-propanediol, etc. are preferable. Thus, the introduction of the unit of the formula (I) may be achieved by the use of the said diols. Alternatively, such unit may be introduced by the use of the self-condensation product of the said diol or of the co-condensation product of the said diol with an optionally branched C₁–C₈ alkylene glycol such as ethylene glycol, 1,4-butylene glycol or neopentyl glycol in the presence of a catalyst such as phosphorus acid. It may be also introduced by the use of the polyetherdiol obtainable by addition of an alkylene oxide to the said diol or its self-condensation product. Where the polyetherdiol is used, it is preferred that the molecular weight of such polyetherdiol does not exceed about 7,000, because the use of a polyetherdiol having a higher molecular weight results in poorer reaction with a polyisocyanate, sometimes with deterioration of the physical properties.

The introduction of the unit of the formula (I) can be also accomplished by the use of a polyesterdiol obtainable by condensation of the said diol with a dicarboxylic acid. Examples of the usable dicarboxylic acid are aromatic dicarboxylic acids (e.g. terephthalic acid, isophthalic acid), aliphatic dicarboxylic acids (e.g. adipic acid, sebasic acid, suberic acid, azelaic acid, dodecanedicarboxylic acid, dimer acid), alicyclic dicarboxylic acids (e.g. 1,2-cyclohexanedicarboxylic acid, 1,4-cyclohexanedicarboxylic acid), oxy acids (e.g. hydroxybenzoic acid, hydroxyethoxybenzoic acid), etc. The molecular weight of the polyesterdiol may be usually not more than about 7,000.

The unit of the formula (II) can be originated from an organic diisocyanate compound. Examples of the diisocyanate compound are 4,4'-diphenylmethane diisocyanate, 1,4-phenylene diisocyanate, 2,4-tolylene diisocyanate, naphthalene diisocyanate, 1,4-cyclohexane diisocyanate, 4,4'-dicyclohexylmethane diisocyanate, xylylene diisocyanate, isophorone diisocyanate, hexamethylene diisocyanate, etc. Among them, the use of aliphatic diisocyanates is favorable for production of improvers and the use of 4,4'-diphenylmethane diisocyanate is preferred for production of shaped articles.

The unit of the formula (III) can be originated from diol compounds which may be aliphatic or aromatic, or their anhydrides. Specific examples of the diol compound are ethylene glycol, propylene glycol, 1,4-butanediol, 1,6-hexanediol, neopentyl glycol, 2,2-(p,p-dihydroxyphenyl)-propane, resorcinol, etc. Specific examples of its anhydride are ethylene oxide, 1,2-propylene oxide, tetrahydrofuran, etc. The said unit may be also introduced by the use of polyether glycols obtainable by polymerization of the said diol compound or its anhydride.

The unit of the formula (IV) may be introduced by the use of a dicarboxylic acid, of which examples are succinic acid, glutaric acid, adipic acid, suberic acid, azelaic acid, sebacic acid, terephthalic acid, isophthalic acid, etc.

The unit of the formula (V) can be introduced from a diamine compound or a hydrazine compound. As the diamine compound, there may be exemplified ethylene diamine, 1,2-propylene diamine, hexamethylene diamine, xylylene diamine, 4,4'-diaminodiphenylmethane, etc. As the hydrazine compound, there can be exemplified hydrazine, β-aminopropionic acid hydrazide, carbodihydrazide, etc.

Among the above units of the formulas (I) to (V), those of the formulas (I) and (II) are essential, and others are optional.

The urethane polymer of the invention can be produced by subjecting the diol of the following formula (VI) or the polyesterdiol between the said diol (VI) and a dicarboxylic acid and an organic diisocyanate with or without any polyesterdiol and/or polyetherdiol having a molecular weight of 500 to 7,000 (except those of the formula (VI)) and also with or without a low molecular weight chain extender to reaction:

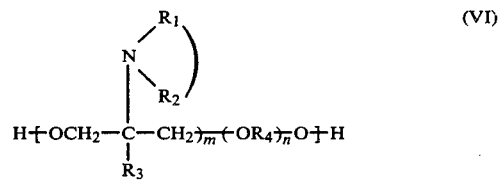

wherein $R_1$, $R_2$, $R_3$, $R_4$, m and n are each as defined above.

The construction of the urethane polymer according to the invention may be represented, for instance, by the formula: —[I]—[II]⫲ₚ{[III]—[II]}_q{([I]—[IV]-)_r—[I]—[II]}_x—{([III]—[IV])_s[III]—[II]}_t{[V]—[II]}_y (wherein p is a positive integer, q, r, s, t, x and y are each zero or a positive integer and the arrangements of [I]—[II], [III]—[II], ([I]—[IV])_r[I]—[II], ([III]—[IV])_s—[III]—[II] and [V]—[II] may be optional).

The urethane polymer to be used as the improver for other polymers preferably contains the diol component represented by the formula (I) in such an amount that the tertiary nitrogen atom-containing group is not less than 30 mol %, preferably not less than 60 mol %, on the basis of the total diol components which may comprise the diol component of the formula (I) and optionally the diol component of the formula (III). The reaction between these diol component(s) and the diisocyanate component of the formula (II) affords the polyurethane. The molar ratio of the diol component(s) and the diisocyanate component is preferred to be from 1.04 to 1.5. Alternatively, the diol component(s) may be reacted with an excessive amount of the diisocyanate component to give a prepolymer, which may be chain-extended by the aid of a low molecular weight chain extender. In this case, the molar ratio of the diisocyanate component and the diol component(s) is preferred to be 1.4 to 2.5. As the low molecular weight chain extender, there may be used the diamine compound or the hydrazine derivative of the formula (V) as well as diol compounds. Chain extension by the use of the diol compound of the formula (III) or of the tertiary nitrogen atom-containing diol of the formula (I) not having a large molecular weight is also possible.

Condensation of the dicarboxylic acid of the formula (IV) with an excessive amount of the diol component(s) (i.e. the one of the formula (I) or the ones of the formulas (I) and (III)) can afford a polyester having a hydroxyl group at the terminal position, which is relatively of low molecular weight. Reaction of the polyester with a diisocyanate gives a polyester polyurethane, which may be chain-extended by the aid of a low molecular weight chain extender. All these are within the scope of the invention.

The urethane polymer to be used as an improver for other polymers usually contains a tertiary nitrogen atom in an amount of not less than 50 milliequivalents, preferably of not less than 100 milliequivalents, per kilogram of the urethane polymer. The urethane polymer to be used as such for manufacture of shaped articles normally contains a tertiary nitrogen atom in an amount of 10 to 400 milliequivalents per kilogram of the urethane polymer, although the amount is varied within a broad range depending upon the use. When the content is less than the lower limit, a sufficient improvement is hardly expected. When more than the upper limit, the fastness is comparatively low.

The proportion of the essential and optional units which constitute the urethane polymer may be normally as follows: (I)+(III), 20 to 67 mol %; (II), 0.5 to 55 mol %; (IV), 0 to 50 mol %; (V), 0 to 30 mol %.

The number average molecular weight of the urethane polymer may be determined by measurement of the intrinsic viscosity and with the gel permeation chromatography (GPC) when the value of the molecular weight is 3,000 or more. When less than 3,000, it may be determined by measurement with a vapor pressure osmometer.

According to the GPC method, the number average molecular weight (Mn) is calculated from the intrinsic viscosity ($[\eta]$) of the urethane polymer as a specimen and the flow amount on GPC measurement by the aid of a calibration curve showing the relationship between the product ($Mn \times [\eta]$) of the number average molecular weight and the intrinsic viscosity and the flow amount on GPC measurement.

When the urethane polymer of the invention is used for improvement of the physical properties of conventional polyurethane elastomers, its incorporation in a large amount will be needed in case where the tertiary nitrogen atom content is small. Such incorporation in a large amount may deteriorate the physical properties of polyurethane elastomers. In order to reduce the amount to be incorporated, the tertiary nitrogen atom content of the urethane polymer should be kept at a high content. Usually, the amount of the tertiary nitrogen atom-containing polymer to be incorporated may be from 0.1 to 20% by weight, preferably from 0.2 to 10% by weight, and the tertiary nitrogen atom content should be adjusted to such an extent that the use of the resultant polymer within the said range is possible.

The urethane polymer of the invention may be used as such or in combination with any other polymer, particularly a polyurethane elastomer, for manufacture of any shaped article. Further, it may be used as a coating agent, an impregnating agent, etc. When used as a composition with any other polymer, the amount of the urethane polymer to be incorporated may be an amount sufficient to stabilize the other polymer. Thus, the tertiary nitrogen atom content may be from 10 to 400 milliequivalents per kilogram of the composition.

The number average molecular weight of the urethane polymer according to the invention as determined by the methods as stated above is not less than 500. Although no restriction is present on the upper limit, it is usually not more than 500,000. For the use as an improver, the urethane polymer has usually a molecular weight of 500 to 30,000, preferably of 600 to 20,000. Where the urethane polymer is of low molecular weight, the presence of a hydroxyl group at the terminal position is favorable.

The urethane polymer of the invention may be used as an improver for other polymers, particularly polyurethane elastomers and also as shaped articles such as fibers, tapes, films, etc. by dry, wet or melt molding. Further, it may be used for manufacture of synthetic leathers, paints, coating compositions, etc.

When desired, the urethane polymer or a composition comprising the same according to the invention may be incorporated with antioxidants such as hindered phenol antioxidants and hindered amine antioxidants, ultraviolet ray absorbers such as benzotriazole ultraviolet ray absorbers, etc. These additives are required not to lower the resistance to color change due to gas. As the hindered phenol antioxidants which do not cause the lowering of the resistance to color change due to gas, there are exemplified the following phenolic compounds (VII) or (VIII) which can enhance the resistance to light synergistically in combination with the tertiary nitrogen atom-containing polymer of the invention:

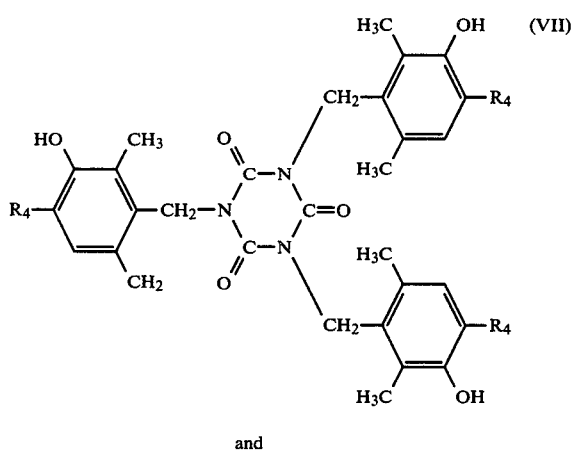

and

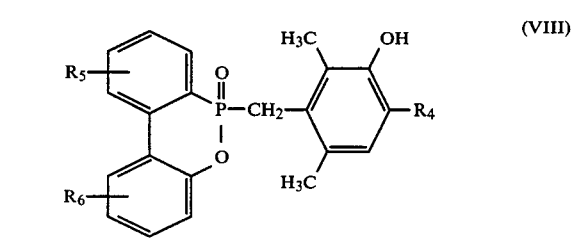

wherein $R_4$ is an alkyl group, a cycloalkyl group, a neopentyl group or an aralkyl group and $R_5$ and $R_6$ are each a hydrogen atom, a halogen atom, an alkyl group or an alkoxy group.

Specific examples of the phenolic compound (VII) are 1,3,5-tris(4-t-butyl-3-hydroxy-2,6-dimethylbenzyl)-isocyanuric acid, 1,3,5-tris(4-sec-butyl-3-hydroxy-2,6-dimethylbenzyl)isocyanuric acid, 1,3,5-tris(4-neopentyl-3-hydroxy-2,6-dimethylbenzyl)isocyanuric acid, etc. Among them, preferred is 1,3,5-tris(4-t-butyl-3-hydroxy-2,6-dimethylbenzyl)isocyanuric acid, because of its easy availability and remarkable effect.

Preferred examples of the phenolic compound (VIII) are those wherein $R_4$ is branched alkyl, cycloalkyl, neopentyl or aralkyl having $C_4$–$C_8$ carbon atoms. Specific examples are 10-(2',6'-dimethyl-4'-t-butyl-3'-hydroxybenzyl)-9,10-dihydro-9-oxa-10-phosphaphenanthrene-10-oxide, 6-methyl-10-(2',6'-dimethyl-4'-t-butyl-3'-hydroxybenzyl)-9,10-dihydro-9-oxa-10-phosphaphenanthrene-10-oxide, 6-methoxy-10-(2',6'-dimethyl-4'-t-butyl-3'-hydroxybenzyl)-9,10-dihydro-9-oxa-10-phosphaphenanthrene-10-oxide, 10-(2',6'-dimethyl-4'-cyclohexyl-3'-hydroxybenzyl)-9,10-dihydro-9-oxa-10-phosphaphenanthrene-10-oxide, 10-{2',6'-dimethyl-4'-(α,α-dimethylbenzyl)-3'-hydroxybenzyl}-9,10-dihydro-9-oxa-10-phosphaphenanthrene-10-oxide, 10-(2',6'-dimethyl-4'-neopentyl-3'-hydroxybenzyl)-9,10-dihydro-9-oxa-10-phosphaphenanthrene-10-oxide, 3-chloro-10-(2',6'-dimethyl-4'-t-butyl-3'-hydroxybenzyl)-9,10-dihydro-9-oxa-10-phosphaphenanthrene-10-oxide, etc.

The amount of the phenolic compound to be incorporated may be an amount sufficient to stabilize the composition to light and is usually from about 0.1 to 10% by weight, preferably from about 0.5 to 8% by weight, based on the weight of the urethane polymer or a composition comprising the urethane polymer.

When desired, the urethane polymer or the composition comprising the same may be combined with any additive such as stabilizers (e.g. color change inhibitors of hydrazine derivatives), dyestuffs and pigments and metal salts of higher fatty acids.

For blending the urethane polymer with any other polymer, particularly a polyurethane elastomer, the urethane polymer may be incorporated into the other polymer at any stage in the manufacture of the latter, preferably at the stage after the completion of the polymerization and before the molding of the produced polymer.

The resultant urethane polymer or the composition comprising the same can be shaped into fibers, tapes, films, etc. by dry, wet or melt molding. Further, it can be used for production of foams, elastomers, synthetic fibers, paints, etc. Its use as fibers for clothes and tapes is particularly advantageous. Moreover, it may be blended with an organopolysiloxane or a fluororesin and molded into an appropriate shape, optionally followed by quaternization to use as an anti-thrombosis material for binding heparin thereon.

Practical and presently preferred embodiments of the present invention are illustratively shown in the following Examples wherein % and part(s) are by weight unless otherwise indicated. The physical properties of the products in those Examples were determined by the following methods:

Test for color change due to gas:
According to the method as described in JIS L-0855 1976, five units were subjected to the test. The b values before and after the test were measured by the use of a color difference meter (manufactured by Nippon Denshoku Kogyo K.K.; Model ND-101D), and the extent of color change was indicated by the difference (Δb) between them.

Test for dyeing property:
Polyurethane fibers of 40 denier were scoured and then subjected to dyeing under the following conditions:
C.I. Acid Red 6: 1 % owf
"New born TS" (manufactured by Nikka Kagaku K.K.; leveling agent): 5% owf
pH: 3.5
Bath ratio: 1:50, 100° C.×60 min. dyeing Observation was made on dyeing property, fastness to laundering (JIS L-0844-1976; A-2 method; cotton staining, silk staining).

Test for resistance to light:
Polyurethane fibers of 40 denier were scoured in an aqueous solution of "Neugen HC" (manufactured by Daiichi Kogyo Seiyaku, K.K.; non-ionic surfactant) (1 g/liter) at 80° C. for 20 minutes. Irradiation was made with a fadeometer for 20, 40, 60 or 80 hours. From the tenacity variation curve determined by a Tensilon measuring apparatus, the irradiation time (T ½) during which the tenacity was decreased to half was decided.

EXAMPLE 1

Figure 2:
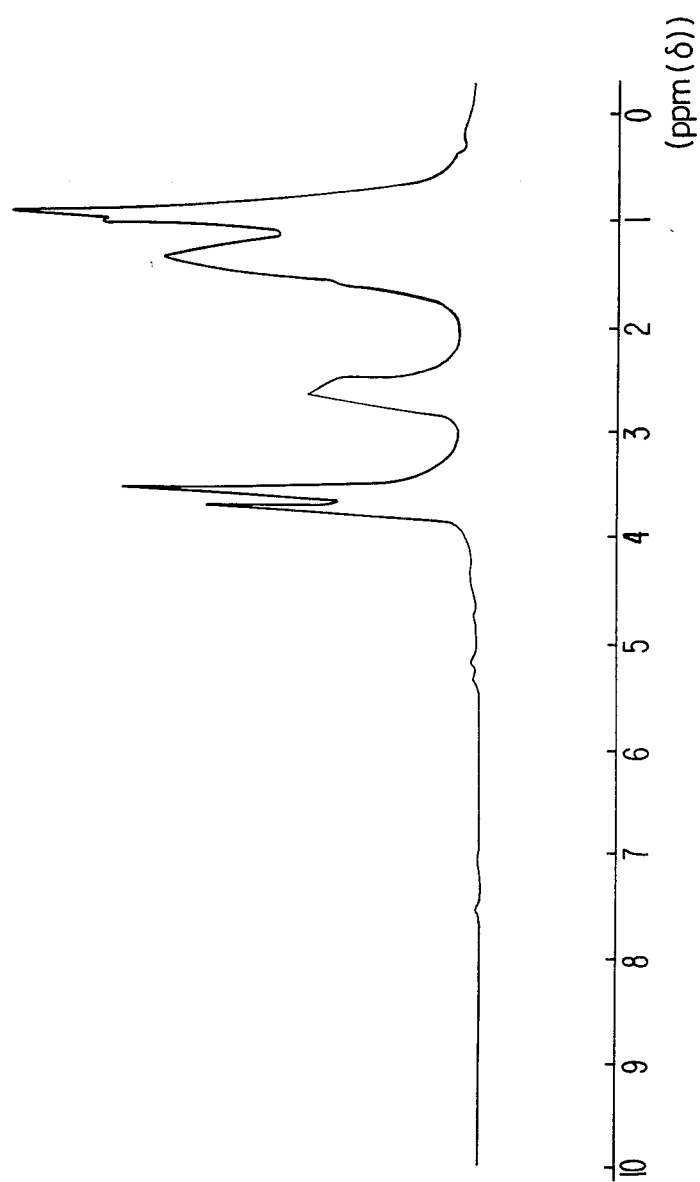

A mixture of 2-amino-2-ethyl-1,3-propanediol (300 parts), n-butyl bromide (733 parts), sodium carbonate (530 parts), tetrahydrofuran (250 parts) and water (370 parts) was heated under reflux for 3 days while stirring. The reaction mixture was extracted with ether. The ether extract was distilled to collect a fraction (175 parts) boiling at a temperature of 107° C./0.09 mmHg. The fraction gave the IR chart and the NMR chart respectively shown in FIGS. 1 and 2 of the accompanying drawings, from which it was confirmed to be 2-ethyl-2-dibutylamino-1,3-propanediol.

The above obtained 2-ethyl-2-dibutylamino-1,3-propanediol (150 parts) and 4,4'-dicyclohexylmethane diisocyanate (130 parts) were dissolved in N,N-dimethylformamide (126 parts), dibutyltin dilaurate ($4\times 10^{-5}$ part) was added thereto, and the resultant mixture was stirred at 60° C. for 90 minutes to obtain a viscous urethane polymer solution having 1.6 equivalents of tertiary nitrogen atom per kg. The molecular weight of the urethane polymer was determined to be 1830 by measurement of the intrinsic viscosity and with the vapor pressure osmometer.

Figure 3:
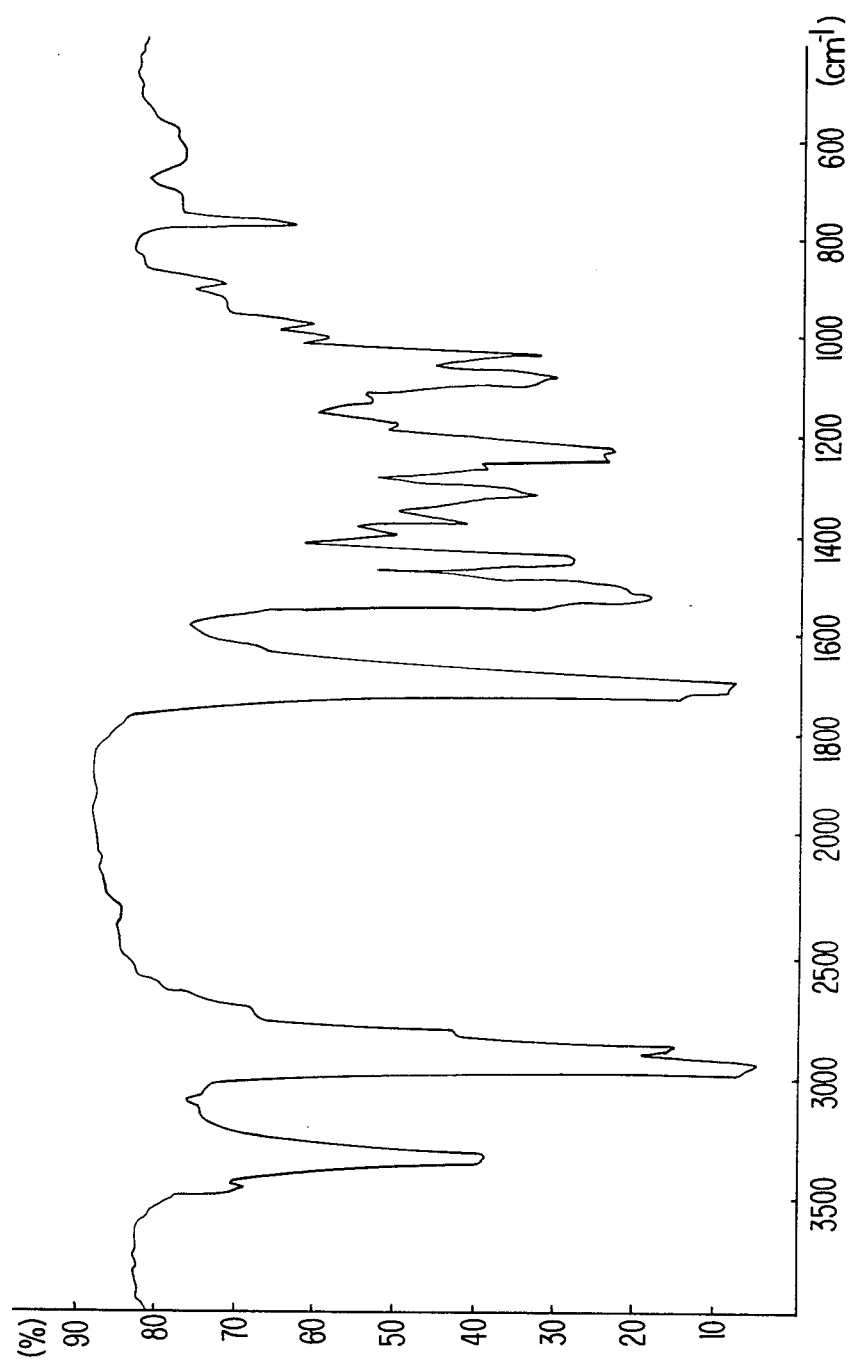

The urethane polymer obtained after removal of the solvent by evaporation under reduced pressure gave the IR chart as shown in FIG. 3 wherein the absorptions at 1685, 1520, 1454, and 1222 cm$^{-1}$ supports the presence of a urethane bond.

EXAMPLE 2

In the same manner as in Example 1 but using n-propyl bromide (658 parts) in place of n-butyl bromide, there was produced 2-ethyl-2-dipropylamino-1,3-propanediol.

The thus obtained 2-ethyl-2-dipropylamino-1,3-propanediol (102 parts) and phosphorous acid (0.4 part) were charged in a reactor equipped with an agitator, and the contents were stirred at a temperature of 220° to 225° C. in nitrogen stream under an autogenic pressure for 6 hours, during which the by-produced water was distilled out. Then, the inner pressure was gradually reduced to 10 mmHg in 4 hours while maintaining the inner temperature at 225° C., and the reaction was further continued at 225° C. under 10 mmHg for 1 hour. The hydroxyl value of the produced polyetherdiol measured according to the method as described in JIS K-0070 was 74.7 (mg KOH/g), which corresponds to a molecular weight of 1,502.

A mixture of the above obtained polyetherdiol (90 parts) and 4,4'-dicyclohexylmethane diisocyanate (28 parts) was stirred at 95° C. for 1 hour. The prepolymer thus produced was dissolved in N,N-dimethylformamide (232 parts) and cooled to 6° C. A 10% solution of 1,2-propylene diamine in N,N-dimethylformamide (27 parts) was gradually added thereto, whereby the chain extension proceeded to give a viscous polyetherurethane solution having a viscosity of 100 poise at 32% concentration. The number average molecular weight of the polyetherurethane was 7,130 when determined by measurement of the intrinsic viscosity and the GPC (using "Yanaco L-1030" manufactured by Yanagimoto Seisakusho K.K.).

EXAMPLE 3

2-Methyl-2-dibutylamino-1,3-propanediol (99 parts), adipic acid (50 parts) and phosphorous acid (0.12 part) were charged in a reactor equipped with an agitator, and the contents were stirred at a temperature of 160° to 215° C. in nitrogen stream under an autogenic pressure for 2 hours, during which the by-produced water was distilled out. Then, the inner pressure was gradually reduced to 0.5 mmHg in 2 hours while maintaining the inner temperature at 215° C. to give a polyester having a hydroxyl group at the terminal position. The polyester had a hydroxyl value of 79.3 (mg KOH/g), an acid value of 3.1 (mg KOH/g) and a molecular weight of 1,362.

The above obtained polyester (132 parts) and 4,4'-dicyclohexylmethane diisocyanate (22 parts) were dissolved in N,N-dimethylformamide (160 parts), dibutyltin dilaurate ($4 \times 10^{-5}$ part) was added thereto, and the resultant mixture was stirred at 70° C. for 80 minutes to give a polyesterurethane solution having a viscosity of 540 poise at 32% concentration. The number average molecular weight was 11,300.

EXAMPLE 4

A mixture of polytetramethylene ether glycol (average molecular weight, 1000) (45 parts) and hexamethylene diisocyanate (50 parts) was stirred at 60° C. for 40 minutes, the polyester having a hydroxyl group at the terminal position as obtained in Example 3 (114 parts) was added thereto, and stirring was continued for 40 minutes. The produced prepolymer was dissolved in N,N-dimethylformamide (367 parts) and cooled to 6° C. A 10% solution of 1,2-propylenediamine in N,N-dimethylformamide (112 parts) was dropwise added thereto, whereby the chain extension proceeded to give a viscous polyesterurethane solution having a viscosity of 430 poise at 32% concentration. The number average molecular weight was 13,800.

EXAMPLES 5 TO 8

A mixture of polytetramethylene ether glycol (average molecular weight, 1950) (1950 parts) and 4,4'-diphenylmethane diisocyanate (500 parts) was stirred at 70° C. for 60 minutes to give a prepolymer having isocyanate groups at both terminal positions. Dimethylformamide (4478 parts) was added thereto to make a uniform solution. The resultant solution was cooled to 0° C., a 46% paste of titanium oxide pigment containing a small quantity of blueing pigment in dimethylformamide (145 parts) was added thereto, and a solution of 1,2-propylenediamine (74 parts) in dimethylformamide (983 parts) was further added thereto quickly at the initial stage and slowly at the later stage while stirring, whereby the chain extension proceeded. When 90% of the 1,2-propylenediamine solution was added and the viscosity of the resulting mixture reached to 2500 poise at 25° C., a solution of monoethanolamine (12 parts) in dimethylformamide (72 parts) was added to the reaction mixture so as to consume the free isocyanate therein, and then a solution of acetic anhydride (10 parts) in dimethylformamide (72 parts) was added thereto for stabilization of the viscosity of the polymer solution. The thus obtained polymer solution had a solid content of 32% and a viscosity of 2200 poise at 25° C. (hereinafter referred to as "A dope").

The tertiary nitrogen atom-containing urethane polymer solutions as obtained in Examples 1 to 4 were each admixed with the A dope so as to make the tertiary nitrogen atom content being 80 milliequivalents/kg, and the resultant mixtures were subjected to dry spinning to make polyurethane fibers of 40 denier. The obtained fibers were subjected to tests for resistance to color change due to gas, dyeing property and fastness to laundering. The results are shown in Table 1 wherein those with fibers not containing the tertiary nitrogen atom-containing urethane polymer are also shown for comparison.

TABLE 1

| Example | Tertiary nitrogen atom-containing urethane polymer | Resistance to color change due to gas (Δb) | Dyeing property | Fastness to laundering (A-2) | |
|---|---|---|---|---|---|
| | | | | Cotton | Silk |
| 5 | Example 1 | 6.7 | O | 5 | 5 |
| 6 | Example 2 | 5.9 | O | 5 | 5 |
| 7 | Example 3 | 6.3 | O | 5 | 5 |
| 8 | Example 4 | 5.4 | O | 5 | 5 |
| Comparative 1 | — | 28.6 | X | — | — |
| Comparative 2 | Comparative 2 | 9.8 | O | 5 | 5 |

Comparative Example 2

In the same manner as described in Japanese Patent Publication (examined) No. 29797/1977, 2-methyl-2-dimethylaminomethyl-1,3-propanediol (88 parts) and adipic acid (58 parts) were heated at 200° C. under an autogenic pressure for 7 hours to give a polyester diol having a molecular weight of 750.

The thus obtained polyester diol (90 parts) and 4,4'-diphenylmethane diisocyanate (25 parts) were dissolved in N,N-dimethylformamide (360 parts), dibutyltin dilaurate ($4 \times 10^{-5}$ part) was added thereto, and the resultant mixture was heated at 60° C. for 70 minutes while stirring, whereby a viscous polyesterurethane solution was obtained. The polyesterurethane solution was added to the A dope to make a tertiary nitrogen atom content being 80 milliequivalents/kg. The resultant mixture was subjected to dry spinning to make polyurethane fibers of 40 denier.

EXAMPLE 9

2-Ethyl-2-dipropylamino-1,3-propanediol (120 parts) prepared as in U.S. Pat. No. 2,363,466 and hexamethylene diisocyanate (84 parts) were dissolved in N,N-dimethylformamide (197 parts), dibutyltin dilaurate ($4 \times 10^{-5}$ part) was added thereto, and the resultant mixture was stirred at 60° C. for 90 minutes, whereby a tertiary nitrogen atom-containing polyurethane solution was obtained. The polyesterurethane solution was admixed with the A dope to make a tertiary nitrogen atom content being 80 milliequivalents/kg. 1,3,5-Tris(4-t-butyl-3-hydroxy-2,6-dimethylbenzyl)isocyanuric acid was added to the above mixture in an amount of 0.32 part to 100 parts of the A dope. The resultant mixture was subjected to dry spinning to make polyurethane fibers of 40 denier.

EXAMPLE 10

The tertiary nitrogen atom-containing polyester polyurethane solution obtained in Example 3 was admixed with the A dope to make a tertiary nitrogen atom content being 80 milliequivalents/kg of the polyurethane. 10-(2',6'-Dimethyl-4'-t-butyl-3'-hydroxybenzyl)-9,10-dihydro-9-oxa-10-phosphaphenanthrene-10-oxide was added thereto in an amount of 0.32 part to 100 parts of the A dope. The resultant mixture was sujbected to dry spinning to make polyurethane fibers of 40 denier.

EXAMPLE 11

The tertiary nitrogen atom-containing polyetherurethane solution obtained in Example 2 was admixed with the A dope to make a tertiary nitrogen atom content of 80 milliequivalents/kg of the polyurethane. 10-(2',6'-

Dimethyl-4'-cyclohexyl-3'-hydroxybenzyl)-9,10-dihydro-9-oxa-10-phosphaphenanthrene-10-oxide was added thereto in an amount of 0.32 part to 100 parts of the A dope. The resultant mixture was subjected to dry spinning to make polyurethane fibers of 40 denier.

Comparative Examples 3 and 4

The A dope not containing any additive (Comparative Example 1), a mixture of the A dope and 1,3,5-tris(4-t-butyl-3-hydroxy-2,6-dimethylbenzyl)isocyanuric acid in an amount of 1% to the polymer (Comparative Example 3) and a mixture of the A dope, 1,3,5-tris(4-t-butyl-3-hydroxy-2,6-dimethylbenzyl)isocyanuric acid in an amount of 1% to the polymer and poly(N-diethylaminoethyl methacrylate) in an amount of 80 milliequivalents/kg of the polymer (Comparative Example 4) were respectively subjected to dry spinning as in Examples 1 to 3 to make polyurethane fibers of 40 denier.

The fibers as obtained in Examples 9, 10 and 11 and Comparative Examples 1, 3 and 4 were each subjected to tests for resistance to color change due to gas, dyeing property and resistance to light. The results are shown in Table 2.

TABLE 2

| Example | Resistance to color change due to gas ($\Delta b$) | Dyeing property | Fastness to laundering (A-2) Cotton | Silk | Resistance to light $T_{\frac{1}{2}}$ (hrs) |
| --- | --- | --- | --- | --- | --- |
| 9 | 7.1 | O | 5 | 5 | 38 |
| 10 | 6.6 | O | 5 | 5 | 36 |
| 11 | 6.3 | O | 5 | 5 | 37 |
| Comparative 1 | 28.6 | X | — | — | 20> |
| Comparative 3 | 29.0 | X | — | — | 35 |
| Comparative 4 | 21.7 | O | 4 | 3–4 | 36 |

From the above results, it is understood that the fibers obtained according to the invention are excellent in resistance to color change due to gas, dyeing property and resistance to light. They are also excellent in fastness to laundering.

EXAMPLES 12 TO 15

2-Ethyl-2-dibutylamino-1,3-propanediol (150 parts) and 4,4'-dicyclohexylmethane diisocyanate (130 parts) were dissolved in N,N-dimethylformamide (126 parts), dibutyltin dilaurate ($4 \times 10^{-5}$ part) was added thereto, and the resultant mixture was stirred at 60° C. for 90 minutes to obtain a tertiary nitrogen atom-containing polyurethane solution. The polyurethane solution was admixed with the A dope to make a tertiary nitrogen atom content being 10, 40, 160 or 320 milliequivalents/kg of the polyurethane. The resulting mixture was subjected to dry spinning to make polyurethane fibers of 40 denier.

The fibers were subjected to tests for resistance to color change due to gas, dyeing property and fastness to laundering. The results are shown in Table 3 wherein those with poly(N-diethylaminoethyl methacrylate) as an additive (Comparative Example 5) are also shown.

TABLE 3

| Example | Tertiary nitrogen atom content (milliequivalents/kg) | Resistance to color change due to gas ($\Delta b$) | Dyeing property | Fastness to laundering (A-2) Cotton | Silk |
| --- | --- | --- | --- | --- | --- |
| 12 | 10 | 10.5 | $\Delta$ | 5 | 5 |
| 13 | 40 | 7.7 | O | 5 | 5 |
| 14 | 160 | 5.4 | O | 5 | 5 |
| 15 | 320 | 5.2 | O | 4–5 | 4–5 |
| Comparative 5 | 40 | 22.5 | $\Delta$-O | 4 | 3–4 |

EXAMPLES 16 AND 17

To the dope as used in Example 13, 1,3,5-tris(4-sec-butyl-3-hydroxy-2,6-dimethylbenzyl)isocyanuric acid (Example 16) or 10-(2',6'-dimethyl-4'-($\alpha,\alpha$-dimethylbenzyl)-3'-hydroxybenzyl)-9,10-dihydro-9-oxa-10-phosphaphenanthrene-10-oxide (Example 17) was added to make a concentration of 1% to the polyurethane. The resultant mixture was subjected to dry spinning to make polyurethane fibers of 40 denier.

The fibers were subjected to test for resistance to color change due to gas. As the result, the polyurethane fibers according to Example 16 and according to Example 17 gave respectively the $\Delta b$ values of 8.1 and of 8.3. Thus, these fibers are markedly improved in resistance to light without material deterioration of resistance to color change due to gas.

EXAMPLE 18

In the same manner as in Example 1 but using 2-ethyl-2-dimethylamino-1,3-propanediol, there was prepared a tertiary nitrogen atom-containing urethane polymer. The thus prepared urethane polymer was admixed with the A dope and subjected to dry spinning, whereby fibers excellent in resistance to color change due to gas, dyeing property and resistance to laundering were obtained.

What is claimed is:

1. A tertiary nitrogen atom-containing urethane polymer which comprises units of the following formulas (I) and (II) as the essential components and units of the following formulas (III), (IV) and (V) as optional components, the content of the unit of the formula (I) being not less than 10 milliequivalents in terms of the tertiary nitrogen atom per kilogram of the urethane polymer, and has a molecular weight of not less than 500:

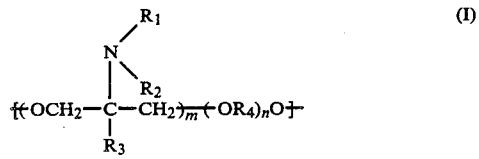

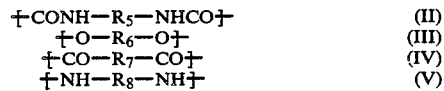

wherein $R_1$ and $R_2$ are each a $C_1$-$C_4$ alkyl group, $R_3$ is a $C_1$-$C_4$ alkyl group, $R_4$ is an optionally branched $C_1$-$C_8$ alkylene group, m is a positive integer and n is zero or a positive integer but m+n is a number which can provide the unit of the formula (I) with a molecular weight of 131 to 6,998 and the bondings in the unit of the formula (I) may be in random or block, $R_5$ is a residue of an organic diisocyanate, $R_6$ is an optionally branched $C_1$-$C_8$ alkylene group, an aromatic group optionally substituted with one or more $C_1$-$C_4$ alkyl groups and/or one or more halogen atoms or a residue of a polyetherdiol thereof, $R_7$ is a residue of a dicarboxylic acid and $R_8$ is a residue of a diamine or a residue of a hydrazine.

2. The urethane polymer according to claim 1, wherein $R_1$ and $R_2$ are each methyl, propyl or butyl and $R_3$ is ethyl.

3. A process for preparing the urethane polymer according to claim 1, which comprises subjecting a diol and/or a polyesterdiol obtainable from the diol and a dicarboxylic acid of the formula:

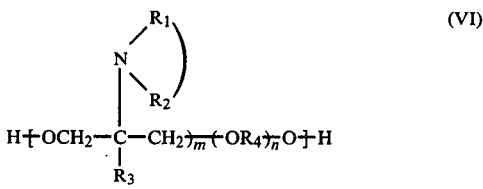

wherein $R_1$, $R_2$, $R_3$, $R_4$, m and n are each as defined in claim 1 and an organic diisocyanate, optionally with a polyesterdiol and/or a polyetherdiol having a molecular weight of 500 to 7,000 except the compound of the formula (VI) and/or with a low molecular weight chain extender to reaction so as to obtain the urethane polymer containing a tertiary nitrogen atom in an amount of not less than 10 milliequivalents per kilogram of the urethane polymer and having a molecular weight of not less than 500.

4. A composition comprising a polyurethane elastomer having the urethane polymer according to claim 1 incorporated therein in amount sufficient to improve the resistance of the elastomer to color change caused by gases.

* * * * *

UNITED STATES PATENT AND TRADEMARK OFFICE
CERTIFICATE OF CORRECTION

PATENT NO. : 4,562,239

DATED : December 31, 1985

INVENTOR(S) : NORIOMI YAMANE ET AL.

It is certified that error appears in the above—identified patent and that said Letters Patent is hereby corrected as shown below:

Title page:

The Related U.S. Application Data should be: --Continuation of Serial No. 405,461, August 5, 1982, now abandoned--.

Column 1, lines 6 and 7, should be --This is a continuation of application Serial No. 405,461, now abandoned.--.

Column 2, line 5 and column 4, line 5, the line joining $R_1$ and $R_2$ in the structural formula should be deleted.

Claim 3 the line joining $R_1$ and $R_2$ in the structural formula should be deleted.

Signed and Sealed this

Eighteenth Day of March 1986

[SEAL]

Attest:

DONALD J. QUIGG

Attesting Officer

Commissioner of Patents and Trademarks